(12) United States Patent
Holst

(10) Patent No.: US 11,808,558 B1
(45) Date of Patent: Nov. 7, 2023

(54) LASER ASSISTED STEAM ENERGIZED ROCKET (L.A.S.E.R.)

(71) Applicant: James Michael Holst, Chandler, AZ (US)

(72) Inventor: James Michael Holst, Chandler, AZ (US)

( * ) Notice: Subject to any disclaimer, the term of this patent is extended or adjusted under 35 U.S.C. 154(b) by 0 days.

(21) Appl. No.: 17/662,620

(22) Filed: May 9, 2022

(51) Int. Cl.
*F42B 6/00* (2006.01)

(52) U.S. Cl.
CPC .................................... *F42B 6/00* (2013.01)

(58) Field of Classification Search
CPC ........................................................ F42B 6/00
See application file for complete search history.

(56) References Cited

U.S. PATENT DOCUMENTS

| | | | | |
|---|---|---|---|---|
| 6,488,233 B1 * | 12/2002 | Myrabo | ................ | B64G 1/405 244/62 |
| 8,333,346 B2 * | 12/2012 | Im | ........................ | B64G 99/00 244/125 |

* cited by examiner

*Primary Examiner* — Michael C Zarroli

(57) ABSTRACT

To use launchpad based laser beam generators to stream 50+ kilowatt laser beams up through clear fused quartz discs located in the base of the rocket to super heat the steam in the rocket's pressure chamber for the purpose of increasing the thrusting power of the rocket. This rocket does not use fossil fuel, but rather it uses 99% pure hydrogen peroxide fuel, (H2O2) which flashes into steam without the use of combustion.

1 Claim, 4 Drawing Sheets

LASER ASSISTED STEAM ENERGIZED ROCKET (L.A.S.E.R.)

BACKGROUND OF THE INVENTION

High-test hydrogen peroxide fuel (HTP), has been around for over eighty years. This fuel was used in the initial propulsion in the V-2 rockets in world war two, jet packs, torpedoes, drag strip cars, rocket monopropellant and a rocket fuel oxidizer. Laser beam generator kilowatt power has been steadily increasing over the years. This invention involves beaming lasers up into a rocket from the land-based laser generators for the purpose of increasing the temperature of the steam which is created inside the pressure chamber when the HTP passes through the manganese dioxide catalyst within the rocket. The higher temperature steam will create additional pressure in the chamber, which in turn will provide additional thrust for the rocket. This heat is generated without increasing the weight of the rocket.

One main area of laser beam development is being done for the U.S. military. Their program is to use laser beams to shoot down enemy missiles. The U.S. Army laser beam generators are truck mounted, and the U.S. Navy's are ship mounted. This invention uses the truck mounted laser generators. It also uses existing truck mounted rocket launcher technology.

This invention also uses existing clear fused quartz disc's in the base of the rocket which allows for the hot laser beams to pass through and enter the pressure chamber.

BRIEF SUMMARY OF THE INVENTION

A truck mounted rocket propelled by steam. The rocket will be first heated by having a stove type burner plugged in and turned on in the pressure chamber on the launch pad. The electricity will be supplied from a ground based electrical source. 99% pure hydrogen peroxide rocket fuel, (high test peroxide, or HTP) will be injected into the pressure chamber, and then through the manganese dioxide catalysts. The HTP will immediately flash into steam and be forced through the chamber and then pass by the heated burner. This additional heat from the burner will increase the steam pressure in the chamber which will create the additional thrust through the de Laval exhaust nozzles. After liftoff, the additional heat into the pressure chamber will then be created by the heat from the first three of the truck mounted laser beam generators situated around the launch pad. These laser beams will enter the rocket through three of the clear fused quartz discs located in the rocket base. The three laser beams will rotate between nine laser generators on the launch pad. This system will continue throughout the first stage vertical assent of the rocket. These laser generator power will be 50+ kilowatts.

BRIEF DESCRIPTION OF THE SEVERAL VIEWS OF THE DRAWING

FIG. 1a

The location of the detachable payload section. The base of the payload section will have a hatch which would connect to the International Space Station hatch.

The location of the computer directed controls, batteries, and the nitrogen gas tank to be used for equalizing the pressure in the fuel tank.

The insulated, aluminum spun fuel tank which will hold the unpressured, high-test peroxide (HTP) fuel. This fuel will be transported, loaded, and used during flight at room temperature.

The spun, stainless steel pressure chamber. This chamber will house where the conversion of the liquid HTP fuel is converted into high pressure steam and oxygen molecules.

FIG. 1b

Left blank

The location of the 12 inline fuel pumps which will pump the HTP fuel down through the fuel injectors.

The location of the 12, 3D printed fuel injectors which will each convert the HTP fuel into a fine mist.

The location of the 12 manganese dioxide catalysts which converts the fine mist HTP fuel into 300 degree Fahrenheit steam.

The 24 inch in diameter electric burner is located on top of the stainless steel heating disk which when plugged in, will preheat the pressure chamber on the pad to 1000 degrees Fahrenheit. At liftoff, the 300 degree steam mixes with the heated chamber creating a higher temperature steam and more pressure.

This suspended stainless steel disc will come into contact with 3 continuous streams of laser beams just after liftoff.

The location of 3 smaller second stage exhaust nozzle caps and 3 larger first stage exhaust nozzle caps. At liftoff, the first stage caps are open and the second stage caps are closed.

The location of the 3 second stage exhaust nozzles.
The location of the 3 first stage exhaust nozzles.

Figure 1A:
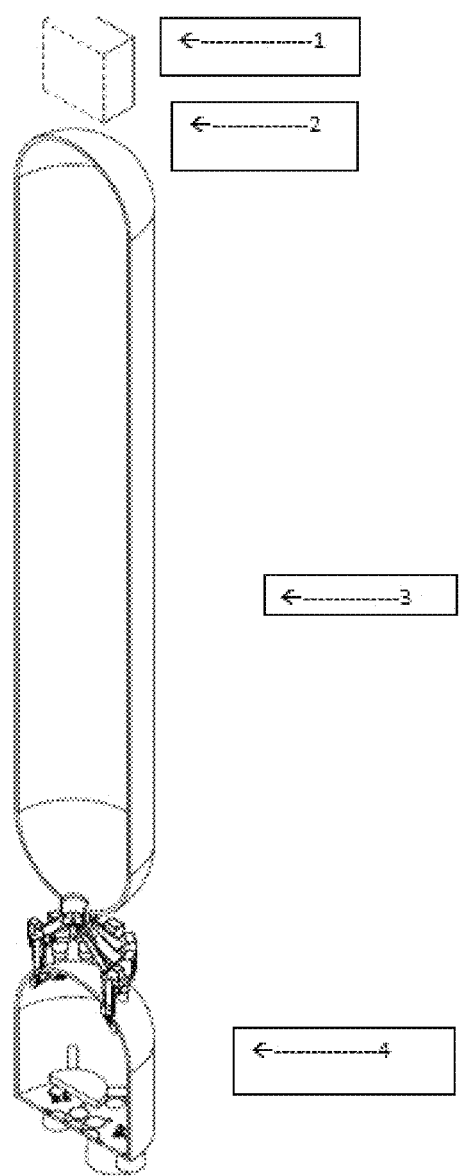
Figure 1B:
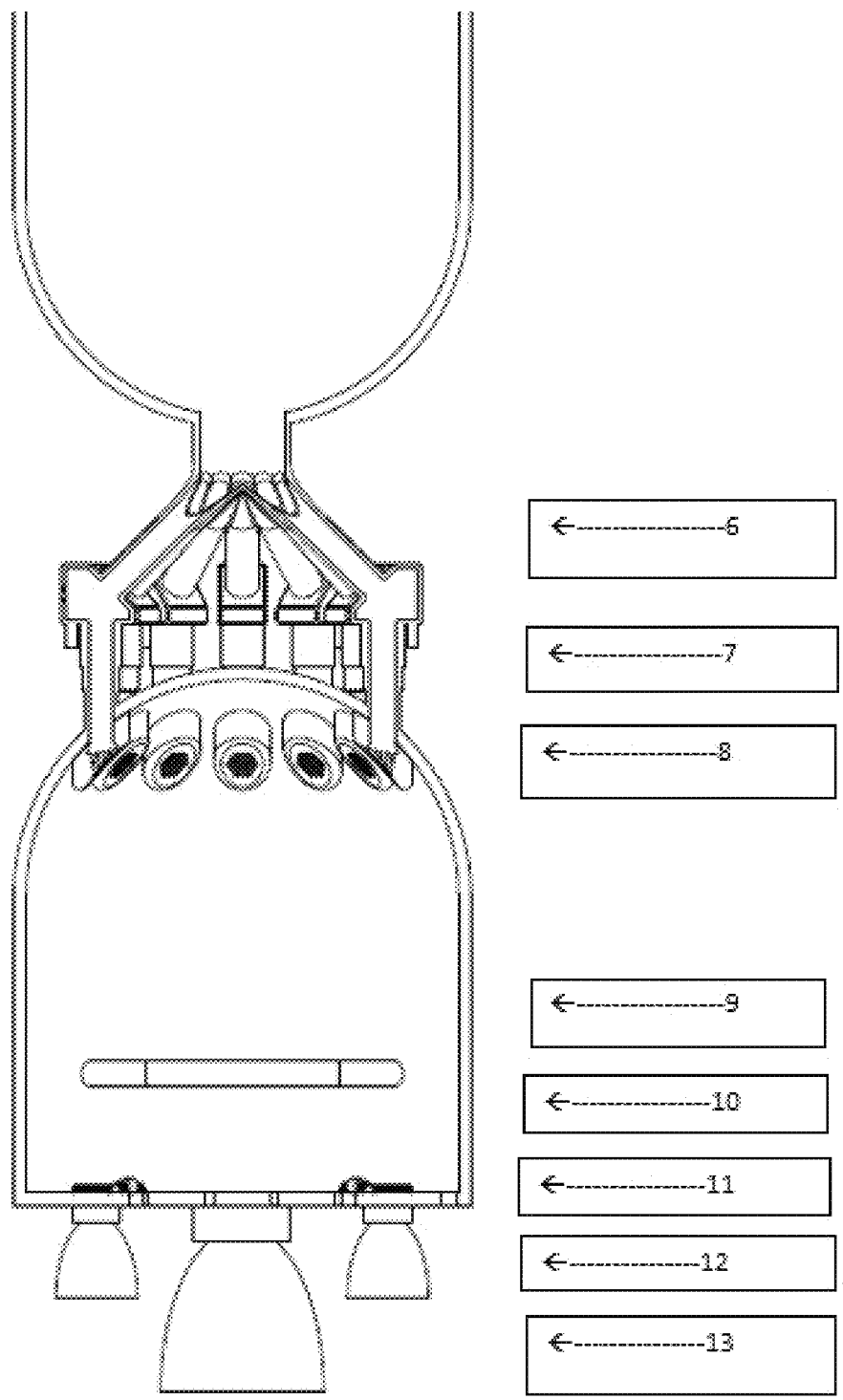
Figure 1C:
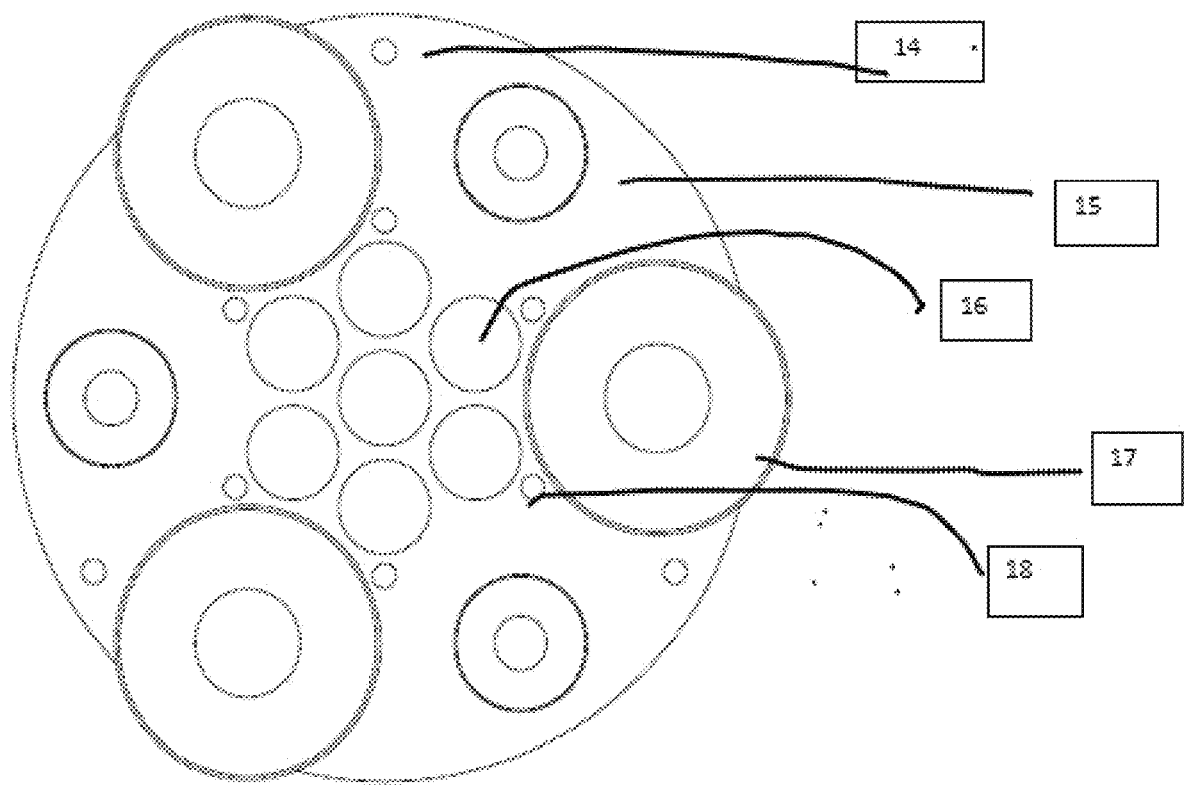
Figure 1D:
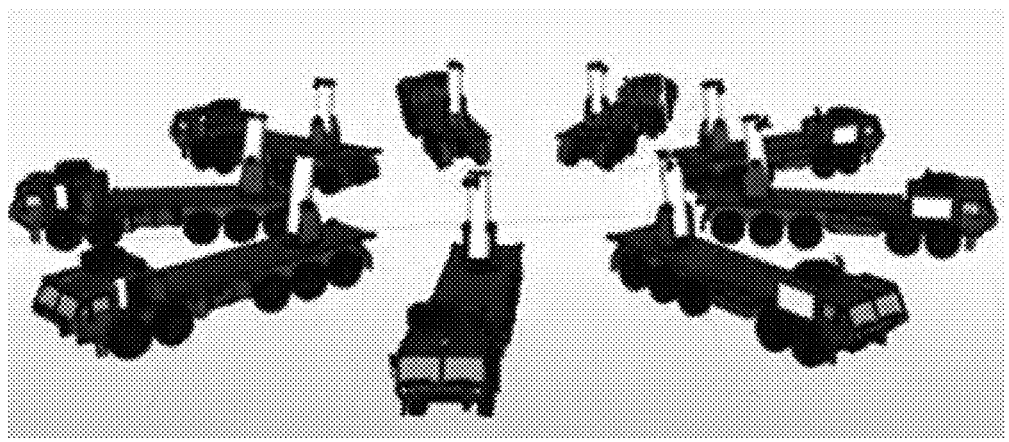

FIG. 1c 3 triangulating laser beam navigational beams to precisely locate the rocket and direct the ground based laser beams into the center of the quartz disks in the center of the base of the rocket.

The location of the 3 second stage de Laval shaped exhaust nozzles.

The location of the seven, eight inch diameter, 3 inch thick, clear, fused quartz disks.

The location of the 3 first stage de Laval shaped exhaust nozzles.

The location of the six heat sensors which will sense if the laser beams diffuse enough to be larger than the quartz disks. If so, the laser beams will shift toward the center quartz disk.

FIG. 1d

These 50 kw laser generators are based on the US Army and Navy's development of 50+ kw laser generators.

The laser generator vehicle is based on the US Army's "family of medium tactical vehicles" (FMTV)

DETAILED DESCRIPTION OF THE INVENTION

To create a rocket propulsion system that combines the use of high test peroxide fuel (HTP) with the heat of laser beams. This occurs in the rocket's stainless steel pressure chamber without the use of combustion.

The HTP fuel is loaded into the aluminum fuel tank at room temperature and not under pressure.

There is a single main fuel line that connects the fuel tank to the twelve feeder lines to the pressure chamber. Twelve inline fuel pumps are connected to twelve 3D printed fuel injectors located in a circle around the top of the pressure chamber. The twelve fuel injectors spray the fuel through the manganese dioxide catalysts where it flashes into 400+ Fahrenheit steam and oxygen gas. A suspended heating element and heat disk is located in the center of the pressure chamber that will super heat the steam. Seven clear fused quartz discs are located in the base of the pressure chamber at the base of the rocket. Six de Laval exhaust nozzles are also located at the base of the pressure chamber and then protrude through the base of the rocket. There are three first stage nozzles and three second stage nozzles. The second stage nozzles are half the diameter of the first stage nozzles. The nozzles and the quartz disks are located within of the seven openings in the honeycomb superstructure rocket base. The nozzles align with the fuel injectors at the top of the pressure chamber.

The rocket pressure chamber is initially heated on the launch pad using a remote electrical source. The electricity enters the rocket, through the four support arms, of the suspended heating element and is used to heat the chamber to 1000 degrees Fahrenheit. The HTP fuel (99% liquid hydrogen peroxide) is then sprayed into the top of the rocket's pressure chamber through the twelve fuel injectors, and then directly into the twelve catalysts. The fuel then flashes into steam at 400+ degrees Fahrenheit. The steam is forced down to, and then past the 1000 degree heating element. The steam is super heated to approximately 700 degrees. This in turn creates additional pounds per square inch pressure in the chamber which is then thrusted out through the three first stage nozzles, creating lift off. The three smaller second stage nozzles are capped off.

Once the few seconds pass that it takes for the rocket to clear the launch pad, the first three truck mounted 50+ kw laser generators begin streaming their beams up through the three alternating clear fused quartz disks in the base of the rocket. The laser beams then terminate on the heat disk releasing the heat from the beams into the pressure chamber to maintain the 700 degree heat.

These discs are to be 8 inches in diameter and 3 inches thick. The thickness is necessary to withstand the 1000 degrees F. and the 2000 pounds per square inch pressure. The six de Laval exhaust nozzles are located to the outside of the quartz disks on the base of the rocket.

Nine truck mounted 50+ kilowatt laser generators are located around the launch pad. (with one additional generator as a spare). These laser generators will be in the same class as the US Navy LAws laser generators and the US Army truck mounted laser generators.

A launch sight at or above seven thousand feet elevation would help mitigate atmospheric diffusion of the laser beams.

Three triangulating sensors are located at the outer edge of the rocket base which will communicate with the laser generator system on the launch pad. They will guide the first three laser beams up through the center of each of the three alternating clear fused quartz discs, then into the pressure chamber. They will then terminate at the underside of the heating disk and release their heat. This occurs for the first ten seconds of flight. The first three laser generators then turn off to cool down while the second three laser generators immediately take their place for the next ten seconds through the other three other alternating quartz discs. They then shut off and the third three generators stream their beams. After ten seconds, they shut off and the first three generators start streaming again. go back to the first three generators. Six heat sensors surrounding the quartz discs will sense if and when the laser beams diffuse enough to have all three beams start to migrate toward the center quartz disk.

Steam at 300 degrees F. generates 55 pounds per square inch. It also shows that steam at 547 degrees generates 1000 p.s.i.

At the end of the first stage of the rocket flight, the three spring loaded, first stage nozzles snap shut, and the three second stage nozzle caps spring open. Six of the twelve fuel injectors shut off and the second stage is fueled with the remaining six injectors. This second stage thrusting will only use the HTP fuel passing through the manganese dioxide catalysts for the horizontal acceleration of the flight to reach lower earth orbit.

The invention claimed is:
1. A method of launching a rocket from a launch pad:
load unpressurized high-test hydrogen peroxide (HTP) rocket fuel at room temperature into a tank manufactured from lightweight, spun, aluminum alloy;
preheat a lightweight spun stainless-steel pressure chamber on the rocket to approximately 800° F.;
spray liquid HTP rocket fuel into the chamber, the rocket fuel is pumped by twelve inline fuel pumps, through twelve fuel injectors and then into twelve manganese dioxide honeycombed tubular catalysts;
the liquid rocket fuel is flashed to vapor at approximately 400° F. and at approximately 260 PSI within the chamber; additional heat in the pressure chamber increases vapor pressure to 700 PSI;
this pressurized vapor is then thrust out of the rocket through three lightweight spun stainless steel first stage de Laval exhaust nozzles;
once the rocket clears the launch pad, ground based laser beams will stream up and then into the rocket's pressure chamber through clear fused quartz discs located in a seven-part honey-comb design stainless steel base of the rocket; and
six heat sensors surround the discs;
three sets of laser beam generators will alternate laser streaming for ten seconds and then cease, to enable cooling for twenty seconds during +/−two and a half minutes of the first stage of vertical flight of the rocket;
three triangulating lasers will beam down the exact location of the rocket's location, including the exact location of the center of each of the clear fused quartz discs and the six heat sensors.

* * * * *